United States Patent [19]

Fehrenbacher

[11] 3,813,952

[45] June 4, 1974

[54] ROTARY STEPPING MECHANISM WITH CYLINDER LOCK ARRANGEMENT

[75] Inventor: Wolfgang Fehrenbacher, St. Georgen, Germany

[73] Assignee: Kieninger & Obergfell, Fabrik fur technische Laufwerke and Apparate, St. Georgen, Black Forest, Germany

[22] Filed: Mar. 5, 1973

[21] Appl. No.: 338,413

[30] Foreign Application Priority Data

Mar. 6, 1972 Germany............................ 2210701

[52] U.S. Cl........................................ 74/84, 74/435
[51] Int. Cl........................ F16h 27/04, F16h 55/04
[58] Field of Search.......................... 74/435, 84, 818

[56] References Cited
UNITED STATES PATENTS 1,846,785  2/1932  Breitling ............................ 74/435 X Primary Examiner—Leonard H. Gerin
Attorney, Agent, or Firm—Karl F. Ross; Herbert Dubno

[57] ABSTRACT

A toothed-wheel mechanism for clocks or like small-size precision devices (e.g., stepping mechanisms) comprises a first (driven) toothed wheel having a tooth periphery extending all around the same at least in one plane of the toothed wheel, thereby forming a gear thereof. In another plane thereof, the periphery is formed with gaps flanked by respective teeth, preferably with two or more foreshortened teeth being disposed between successive gaps. A second (driving) toothed wheel is provided with a cylinder segment receivable in the gaps and extending over only part of the periphery thereof of the second wheel while a tooth segment extends over another portion of the periphery of this second wheel for mating engagement with the intergap teeth of the first wheel and of the same intertooth spacing or pitch. The teeth flanking the gap receiving the cylinder segment lie tangent thereto so that the first wheel is immobilized while the cylinder segment of the second wheel is received in a gap of the teeth of the first.

8 Claims, 6 Drawing Figures

ROTARY STEPPING MECHANISM WITH CYLINDER LOCK ARRANGEMENT

FIELD OF THE INVENTION

The present invention relates to a gear machanism of the rotary stepping type and, more particularly, to a system for translating substantially continuous rotary movement into limited angular movement or "partial rotation" using a pair of wheels having parallel axes. The system has particularly utility in clocks, stepping devices and other precision or small-sized instruments and may be used as a mechanism for transforming continuous movement into intermittent or angular stepping movement.

BACKGROUND OF THE INVENTION

In clockworks, precision machinery, programming devices and the like, it is frequently desirable to convert a substantially continuous movement into an intermittent or stepped movement of a wheel, locking the intermittently movable member against either reverse or forward displacement between the active periods. Numerous mechanisms have been provided for this purpose and the system may employ lever mechanisms, cam arrangements or the like (e.g., Geneva or maltese cross arrangements). In general the conventional systems are expensive to manufacture, nonlinear in motion-translating characteristic, highly susceptible to wear and breakdown, and unreliable. For example, Maltese-cross arrangements are known in which the intermittently movable member may comprise a cruciform body which is engaged by a pin of the continuously rotating member. This system has the disadvantage that the intermittent motion of the driven or cruciform member is nonlinear. This disadvantage applies even when a cylindrical portion of the rotatable pin-carry member engages a cylindrical recess of a cruciform member to immobilize the latter against angular displacement intermediate successive engagements of a pin therewith.

In another system for the intermittent rotation of a driven member by a continuously rotatable member, the driven member is provided with a toothed wheel or gear in one plane and a locking array of concavities in another plane, the concavities corresponding to cylinder segments. The driving member is provided with a gear segment which intermittently meshes with the gear of the intermittently driven member to rotate the latter, while a cylindrical surface (lying in a plane axially offset from that of the tooth segment) cooperates with the cylindrical concavity of the driven wheel to lock the latter against displacement until the tooth segment comes again into mesh with the gear wheel of the driven member. This system has the disadvantage that the tooth segment has a relatively large radius and must cooperate with a driven wheel with a relatively small radius. As a consequence, it is not uncommon for the driving wheel to rotate the driven wheel through more than one revolution between successive blocking of the driven wheel by the cylinder of the driving wheel. Obviously such a system cannot be used where only a fractional rotation is desired at the driven end for each revolution of the driving wheel. Furthermore, the prior art system requires that the two wheels be relatively massive and large so that there has been only limited exploitation of cylinder locking as descirbed above in practice.

OBJECTS OF THE INVENTION

The principal object of the present invention is to provide an improved gear mechanism for the transformation of continuous rotation into intermittent rotation, whereby the aforementioned disadvantages can be avoided.

Still another object of the invention is to provide an improved stepping mechanism using cylinder locking of the intermittent or angularly stepped member at relatively low cost, with high accuracy and with a minimum tendency toward breakdown or damage to the operating parts.

Still another object of this invention is to provide an improved angular stepping device, especially for clock works and other precision or small-size apparatus, which is capable of delivering a fractional end rotation of the output element of a system with each full revolution of the input member thereof while locking the output member against rotation in either angular sense between advances of the intermittently displaced member.

Still another object of the invention is to provide an improved stepping mechanism which can be made economically and with low tolerances and without the disadvantages heretofore encountered.

SUMMARY OF THE INVENTION

The above and other objects are attained, in accordance with the present invention, in a toothed-wheel mechanism with cylinder locking for angularly stepping a load, the mechanism comprising an input or driving wheel and an output or driven toothed wheel meshing therewith, the driven wheel having a substantially continuous array of gear teeth in at least one plane perpendicular to the axes of rotation thereof, the mechanism being constructed arranged so as to angularly step the driven toothed wheel through a fraction of a complete revolution for each complete revolution of the input or driving toothed wheel.

The driving wheel, according to the invention, is formed with a tooth segment in a first plane perpendicular to the axis of rotation of this driving wheel and extending over a portion of the periphery thereof, and with a cylinder segment lying in another plane perpendicular to the axis of rotation of the driving wheel and extending substantially over the remainder of the periphery thereof.

The driven wheel is formed with a peripheral array of gear teeth of substantially the same pitch as that of the toothed segment of the driving wheel and forming a continuous gear at least along a portion of the driven wheel, i.e., a gear with no omitted teeth in at least one plane perpendicular to the axis of rotation of the driven wheel, all of the teeth having a gear-tooth shape with involute flanks.

In addition, the driven wheel is formed with angularly equispaced gaps in its peripheral array of teeth in another plane perpendicular to the axis of rotation of the driven wheel and coinciding with the plane in which the cylinder segment of the driving wheel is disposed. The angularly spaced gaps are adapted to receive the cylinder segment to lock the driven wheel against rotation and are defined between teeth of the tooth array of the driven wheel which tangentially embrace the cylinder segment upon its reception in the respective gap.

As noted earlier, it is the intention of the present invention to provide a gear train in which the input member may be continuously driven and the output member is angularly stepped and is locked securely against stepping between intervals of its angular displacement, the mechanism occupying a minimum space and being effective even with high manufacturing tolerances and/or with increasing play as may develop with wear. It is important, in addition, to minimize the wear of the inter-engaging parts and the aforedescribed improvement, wherein the members tangentially embracing the cylinder segment have the profiles or shapes of gear teeth, fulfills all of these requirements.

Preferably the teeth which define the gap in which the cylinder segment is received and which lie tangentially to the cylindrical surface of this segment form teeth of the gear constituted by this driven member as described above, and have involute flanks embracing the cylinder segment.

Advantageously, the tooth segment and cylinder segment of the driving wheel directly adjoin one another and the teeth of the tooth segment may even be elongated to extend into the plane of the cylinder segment. The cylinder segment has end flanks which correspond to merge with or are extensions of the flanks of the teeth of the tooth segment, i.e., the flanks of the ends of the cylinder segments coincide with inner involute flanks of the outer teeth of the tooth segment.

Throughout this discussion and in the preceding portions, wherever reference is made to a gear-tooth shape or configuration, it is intended to specify the usual involute surfaces of gear teeth which are designed to roll upon each other on meshing.

The teeth flanking the gap in which each cylinder of the segment is receivable preferably are elongated to bridge both of the planes of the driving wheel, i.e., are adapted to extend beyond the plane of the cylinder segment into the plane of the tooth segment.

According to an important feature of the invention, between each pair of teeth defining a gap between them (the gap-defining teeth receiving the cylinder segment and adapted to lie tangentially thereto), there are provided $n$ foreshortened teeth at the same pitch or intertooth spacing for engagement by a corresponding ($n$) number of teeth of the segment only after the meshing portions of the driving wheel has passed beyond the engagement centerline of the two wheels, thereby minimizing the frictional engagement between the set of teeth over the arc subtended by the gap with the corresponding teeth of the driving wheel. The teeth which thus engage initially to entrain the driven member simultaneously with disengagement of the cylinder lock, are thus the $n$ teeth between the gap-defining teeth and are only brought into flank engagement with corresponding teeth of the driving segment beyond the common axial plane of the two wheels and flank friction is thereby minimized.

In all prior systems for the stepping of an angularly displaceable driven member, the engagement between the driving member and the driven member or the entrainment thereof takes place initially ahead of this common axial plane or engagement centerline, thereby causing nonuniform force distribution, high frictional wear and play-sensitive force transmission. The axial offset between the teeth of the driving member and the cylinder segment permits at least one tooth to be provided on the driving member which passes at least part of the gap without engagement with a tooth of the driven member until the two teeth extending axially in overlapping relationship, can be brought into engagement, this point of engagement being located beyond engagement centerline and the aforementioned common axial plane.

An important feature of the present invention resides in the provision of a configuration of the end flanks of the cylinder segment so that they are flush with an extension of the outer teeth of the tooth segments and constitute inner flanks of these outer teeth.

The system has the advantage, moreover, that the parts (the driving and driven wheels) may be completely molded from synthetic resin in an injection-molding operation and hence can be made inexpensively and from a material of low-noise level and high resistance to wear.

The invention is capable of providing a stepping mechanism for the driving train of clocks, feed devices of substantially any type, measuring systems or the like without increasing the overall size of the unit. Only two parts are required and indexing or pawl mechanisms are eliminated. In addition, the starting and stopping positions of the output members are precisely defined and a uniform motion transfer between the driving and driven wheel, is obtained. The ratio of revolutions of the driving member to that of the stepped driven member can be determined simply by varying the number of teeth of the tooth segment and the number of teeth between the gaps. The synthetic resin from which the gears are fashioned reduces noise to an insignificant level and practically eliminates wear. The tolerances of manufacture can be great without interfering with effective operation and thus significant wear can be tolerated without disadvantageous effects.

DESCRIPTION OF THE DRAWING

The above and other objects, features and advantages of the present invention will become more readily apparent from the following description, reference being made to the accompanying drawing in which.

SPECIFIC DESCRIPTION

Figure 4:
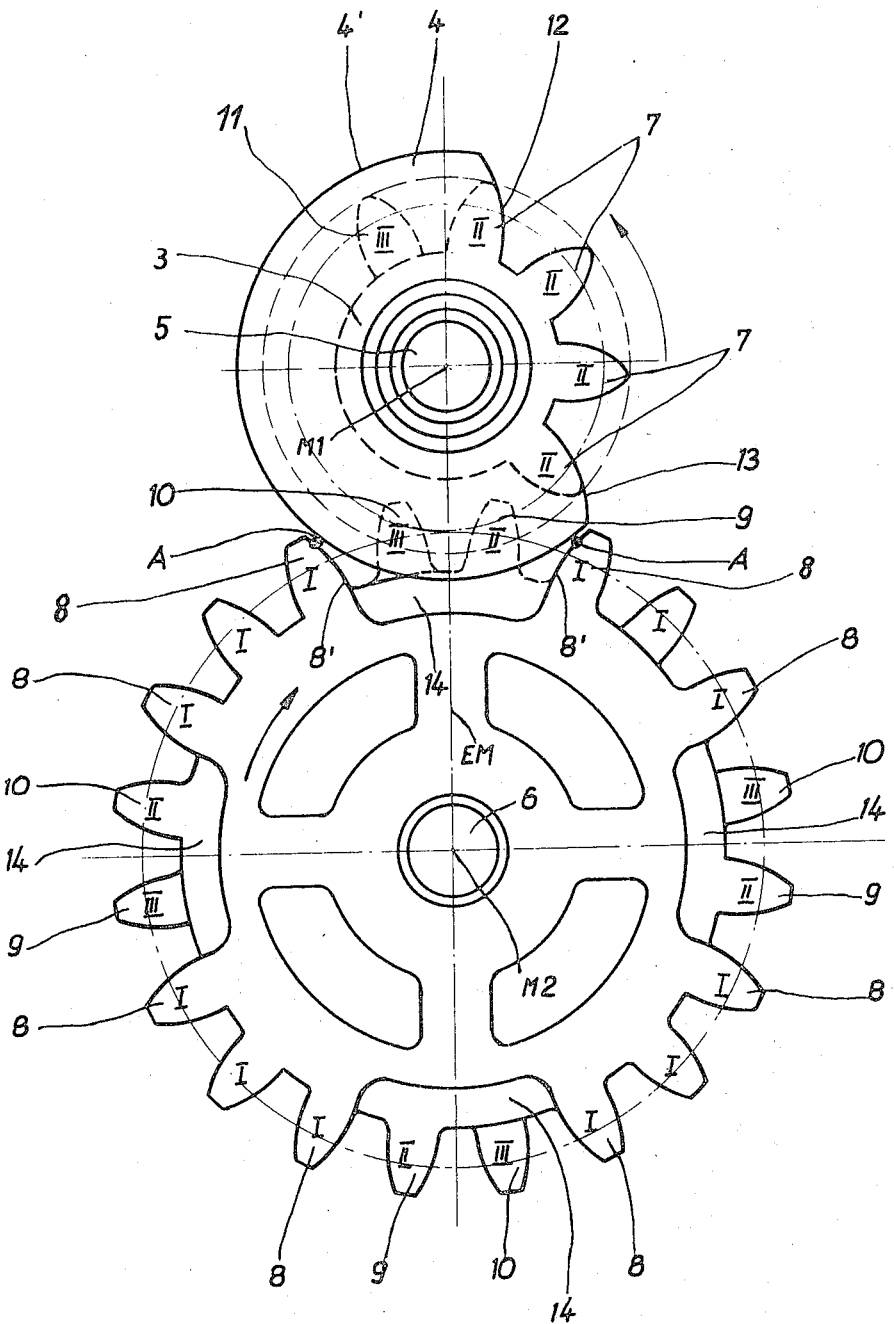
FIG. 4 is another view similar to FIG. 1 showing the parts in a position in which the driven member is immobilized and has been locked by the cylinder segment.
Figure 5:
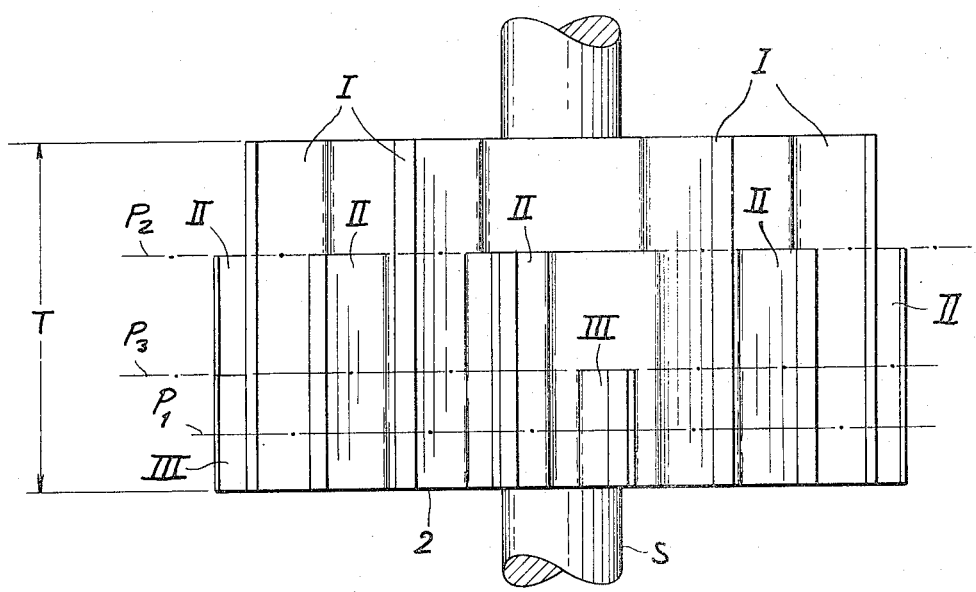
FIG. 5 is an elevational view of the driven member of the system of FIGS. 1 through 4.

Referring first to FIG. 5, it can be seen that the one-piece body 2 has an overall thickness T such that the long teeth I have a length substantially equal to the thickness T. The intermediate-length gear teeth II are foreshortened so that they have a length of approximately two-thirds T while the short teeth III have a length less than one-half T. The gear body 2 is carried by a shaft S and in a plane $P_1$ forms a uniform gear which may be engaged by a gear wheel forming the load. Of course, the load can also be connected to the shaft S. The intermediate gear teeth II lie below a plane $P_2$ just below the plane $P_2'$ (FIG. 6) of the lower edge of the cylinder segment 4 formed on the driving wheel 1. This wheel may also be carried by a shaft S' and may be formed unitarily with a continuous gear G (not seen in FIGS. 1 through 4) in mesh with a source of driving power.

The gear segment 3 comprises teeth 7 which have inner flanks coinciding with the outer flanks of the cylinder segment 4 and outer flanks $7a'$ which have the normal teeth configuration and thus are located ahead of and behind the leading and trailing flanks of the cylinder segment 4, respectively. A shorter gear tooth 11 has its lower edge lying in a plane $P_3'$ which is slightly above the plane $P_3$ of the upper edge of the gear tooth III. Thus the full-length gear teeth I of the driven member 2 (FIG. 5) can mesh with the teeth of segment 3 but not with the tooth 11 since the cylinder segment 4 projects beyond the tooth 11, the intermediate-length teeth II can mesh with all of the teeth of the driving wheel since they clear the cylinder segment, and the short teeth III can mesh with all of the teeth of the segment 3 but not with the tooth 11.

Referring now to FIGS. 1 through 4, it can be seen that the gear wheels 1 and 2, respectively constituting the driving and driven members of the stepping mechanism, mesh such that the cylinder segment 4 is receivable in gaps 14 of the teeth of the driven member 2. The driving wheel 1 is formed with the tooth segment 3 which extends over substantially a small fraction of the periphery of this wheel and a cylinder segment 4 which extends around the remainder of the periphery.

The driven member 2, as shown, constitutes a gear wheel with long teeth I, intermediate teeth II and short teeth III. The wheels 1 and 2 are rotatable about their axes M1 and M2 and are mounted on shafts or pins which may be pressed fitted into bores 5 and 6 of the gear members.

Figure 1:
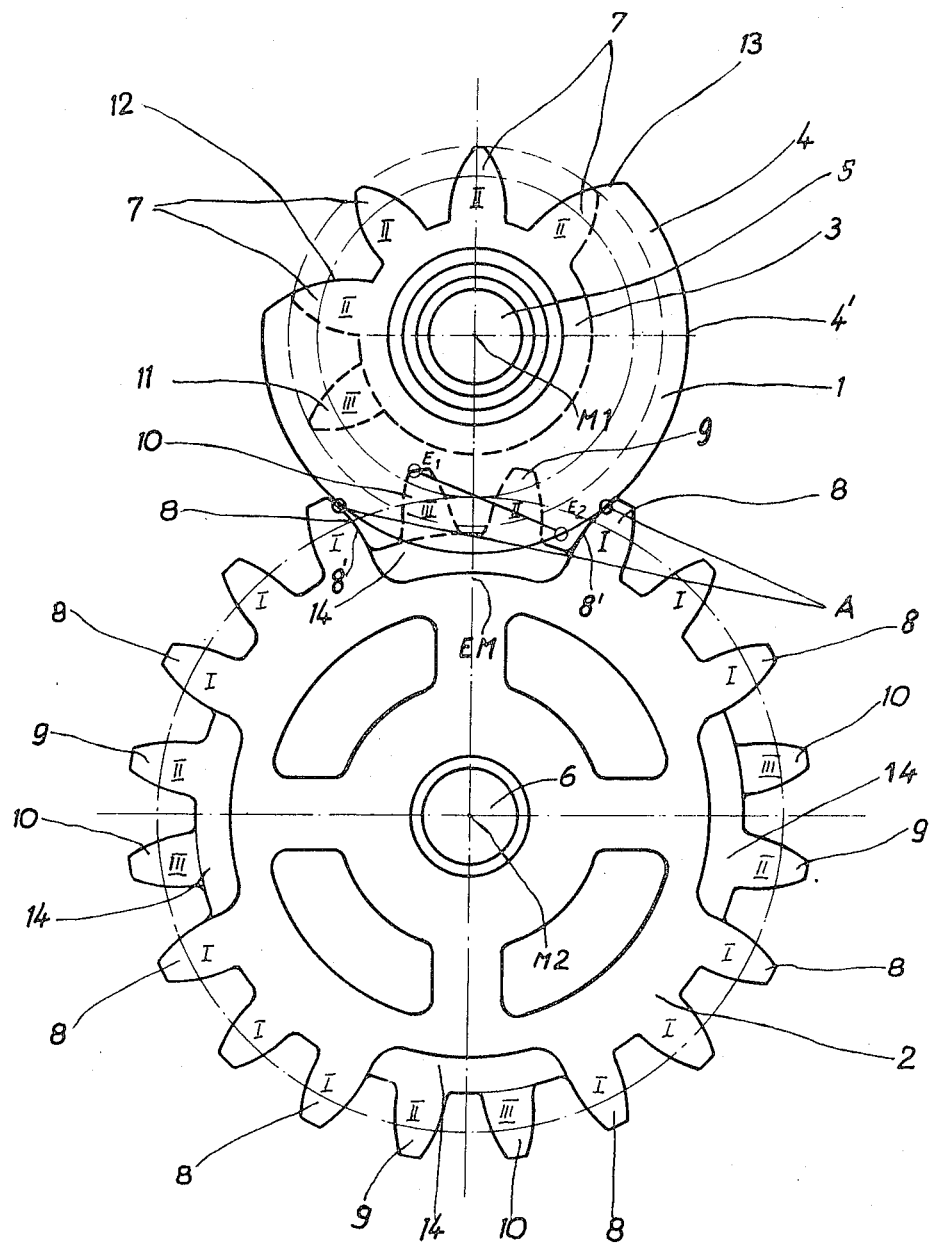
FIG. 1 is a diagrammatic plan view of a stepping mechanism according to the present invention with the driven member in a position in which it is locked against movement by the cylinder segment of the driving member.
Figure 2:
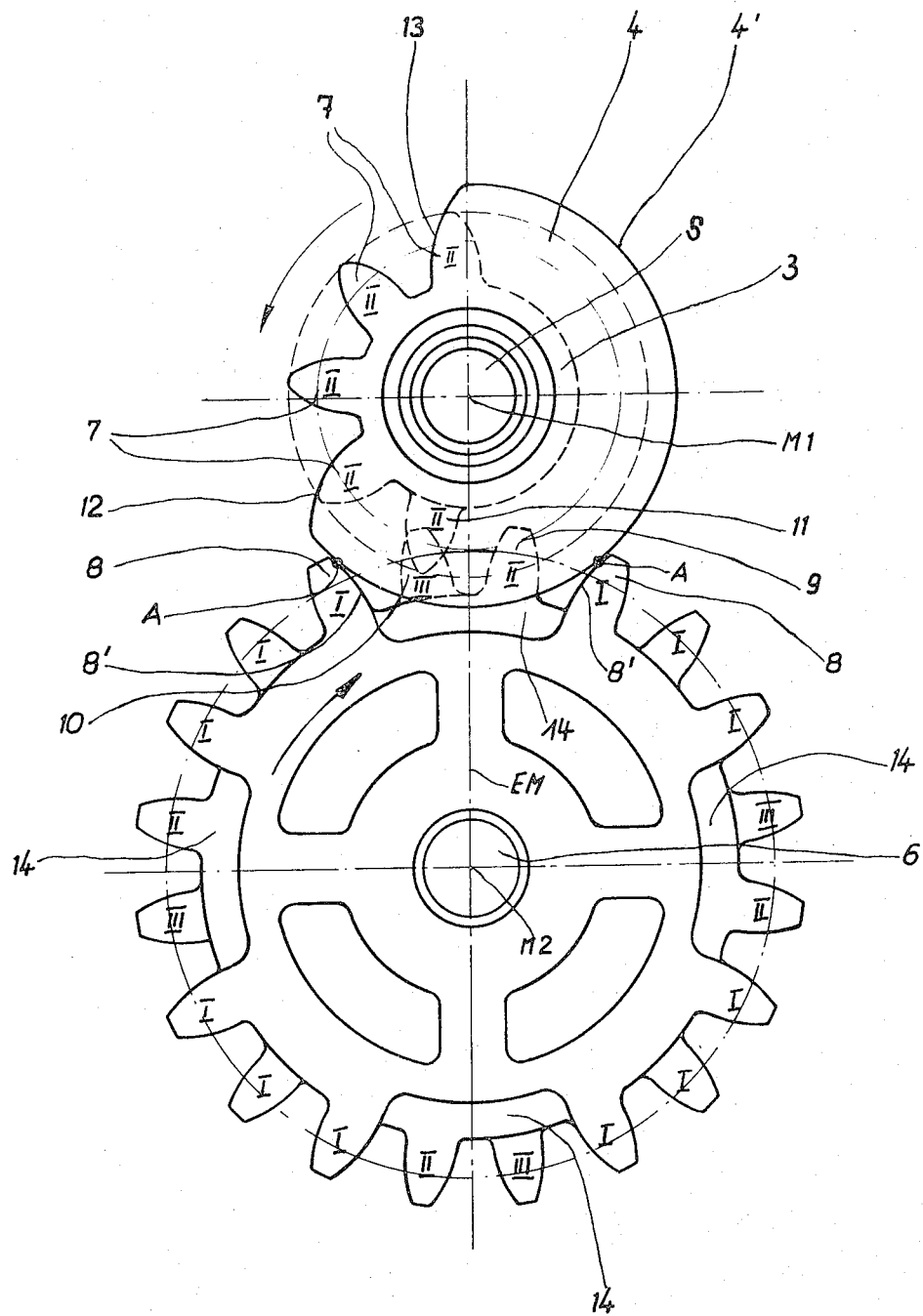
FIG. 2 is a similar view of the mechanism shortly before the driven member is entrained by the driving member.
Figure 3:
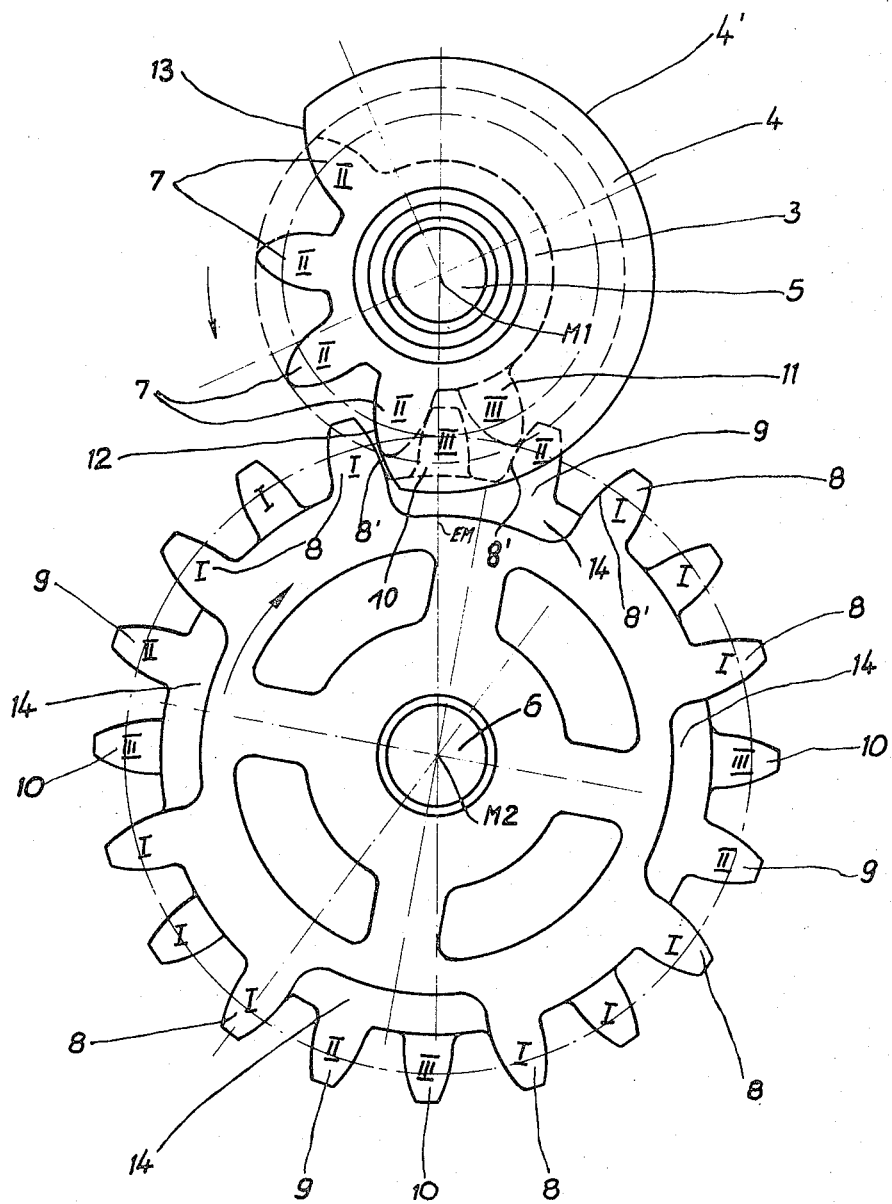
FIG. 3 is a similar view in which, however, the driving member has begun to entrain the driven member.

The tooth segment 3 and the cylinder segment 4 of the driving wheel 1 lie in two different planes perpendicular to the axes of rotation and hence parallel to the plane of the paper in FIGS. 1 and 4 and perpendicular to the common axial plane of axes M1 and M2.

In FIGS. 1 through 4, the tooth segment 3 is shown to be disposed below the cylinder segment 4. The shifting teeth 7 of the cylinder segment 3 designated by the reference character II to show that they may have an intermediate length (equal to that of the teeth II of wheel 2) although they may also extend into the plane of the gear segment (at least those teeth between the end flanks 12 and 13 thereof). The teeth 7 mesh, during advance of the driven member with long teeth I of the driven member. The terms "long," "intermediate" and "short" as used herein refer to the dimensions of the teeth of both parts of the mechanism as measured perpendicular to the plane of the drawing.

The intermediate teeth II of the driven member 2 move in the same plane as the teeth 7 of the segment 3. The long teeth I of the driven member 2 also extend into the plane of the cylinder segment 4 and are adapted to flank this cylinder segment when it is received in a gap 14 defined between these teeth, herein represented at 8. The flanks 8' are tangent, at the points A, to the periphery of the cylinder segment 4. Between the gap-defining teeth 8, the driven wheel 2 is provided with two teeth 9 and 10 represented in broken lines. The tooth 9 is of intermediate length (II) while the tooth 10 is of short length (III), in general, n teeth 9 may be provided between the gap-defining teeth 8 for meshing engagement with the teeth 7 II, of segment 3 at a point beyond the engagement centerline EM or common axial plane, these end teeth being foreshortened relative to the teeth 8 so that the flanks of teeth 9 and 11 do not come into mutual engagement until after they pass the line EM. This position has been shown in FIG. 2.

The teeth 9 and 10 lie below the cylinder segment 4 and the tooth 11 so that, with continued advance of the driving member, tooth 11 is intercepted by tooth 9 and the leading tooth 7A of the gear segment engages the tooth 10 beyond line EM.

Further rotation of member 1 entrains the wheel 2 therewith (FIG. 3) and the remaining teeth 7 have segment 3 carry the wheel 2 there along. The teeth 9 through 11 which are effective only to improve force transmission and reduce the wear of the device are not significant in establishing the transmission ratio of the mechanism and, in fact, merely improve the frictional relationships at the beginning of advance of the driven member.

It is also conceivable, according to the invention, to provide an uneven number of teeth 9 or 10 between each pair of gap-defining teeth and in this case a single tooth may be provided centrally at the engagement central line EM.

Since the degree of overlapping is greater than one, each tooth of the driven member 2 is engaged by a tooth 7 of the segment 3 and advances the same over an angle greater than the angular spread of the teeth.

Figure 6:
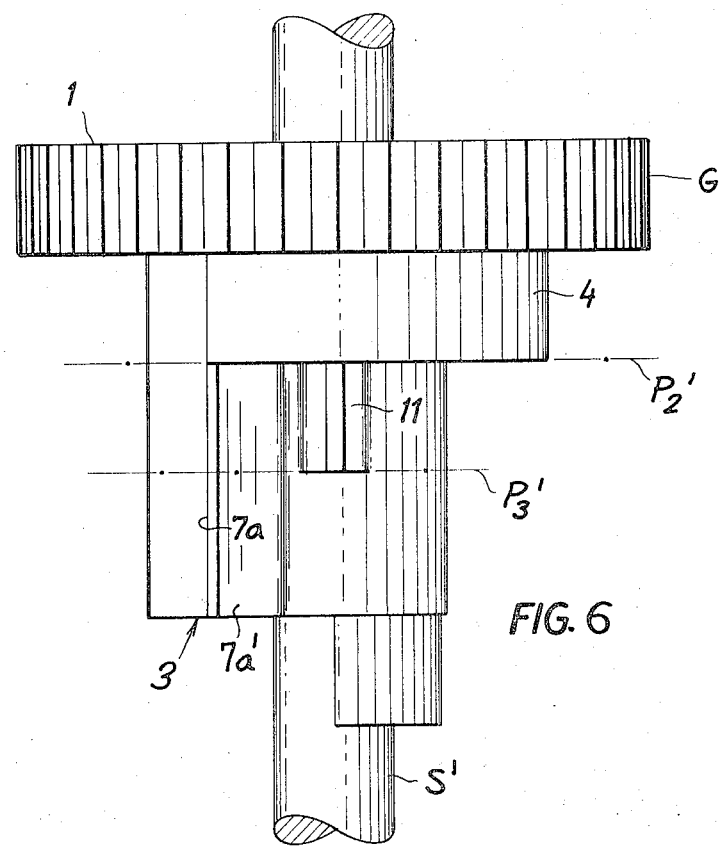
FIG. 6 is an elevational view of the driving member.

The end flanges 12 and 13 of the cylinder segment 4 constitute inner flanges of the first and last teeth 7, as already pointed out for the tooth $7a$ in connection with FIG. 6, so that these end flanks are also involutes rollingly engaged by the teeth of the member 2. Each point E1 on the teeth of the driven wheel member 2 is thus carried to the right (clockwise) to the position represented at $E_2$ as the teeth of the driven wheel roll away from the teeth of the driving wheel. The line of engagement is thus represented at $E_1$–$E_2$, the teeth thereupon moving into positions corresponding to the contact point A at the right-hand side of the drawing (see FIG. 4, the position in which flank 13 clears the right-hand gap-defining tooth of wheel 2).

This advance corresponds to a movement through five teeth of the driven wheel 2 and four teeth 7 of the segment 3. Since the driven wheel, in the illustrated embodiment, has 20 teeth, for each full revolution of the driving member five teeth are advanced and the effective transmission ratio is 1:4.

The wheel 2 has a thickness substantially equal to the length of the longer teeth I as described previously and the gaps are provided in the teeth at equispaced locations as shown at 14. In these regions, the thickness of the wheel may be reduced to the height of the intermediate teeth II. The thickness of the shorter teeth III can be somewhat less than half the thickness of the intermediate teeth II in the preferred embodiment of the invention.

FIGS. 1 through 4 represent, as indicated, a preferred construction in which the tooth segment 3 is provided with four advancing teeth 7 and a short tooth 11 while the driven member 2 has twenty teeth divided into four groups each having a relatively long tooth 8, a tooth 9 of intermediate length, a short tooth 10 and two further long teeth (I) disposed along the periphery of the wheel. The cylinder segment 4 is tangentially engaged by the long teeth 8 flanking the intermediate tooth 9 and the short tooth 10 of each group.

I claim:

1. A stepping mechanism with cylinder locking comprising a driving toothed wheel and a driven toothed wheel mesing therewith and adapted to be angularly stepped through a fraction of a complete revolution for each revolution of said driving wheel, said driving wheel being formed with a toothed segment lying at least in one plane perpendicular to the axis of rotation of the driving wheel and extending over a portion of the periphery thereof and with a cylinder segment lying in another plane perpendicular to said axis and extending substantially over the remainder of said periphery, said driven wheel being formed with a periphery array of gear teeth of substantially the same pitch as that of said toothed segment and constituting a gear from said driven wheel, said array being provided with angularly spaced gaps adapted to receive said cylinder segment and lock said driven wheel against rotation said gaps being defined between teeth of said array tangentially embracing said cylinder segment upon its reception in the respective gap.

2. The stepping mechanism defined in claim 1 wherein said gap-defining teeth are formed with gear-tooth flanks tangentially engaging said cylinder segment upon receipt of the cylinder segment in the respective gap.

3. The stepping mechanism defined in claim 2 wherein said gap-defining teeth extend transversely to said planes and bridge the latter.

4. The stepping mechanism defined in claim 3, further comprising $n$ teeth on said driven wheel disposed between each pair of teeth defining a respective gap and clearing said cylinder segment upon receipt thereof in the latter gap, but engageable with a corresponding number $n$ of teeth of said driving wheel beyond a common axial plane of said wheel upon entrainment by said driving wheel of said driven wheel.

5. The stepping mechanism defined in claim 4 wherein said cylinder segment is formed with end flanks constituting extensions of inner gear-tooth flanks of the outer teeth of said tooth segment.

6. The stepping mechanism defined in claim 1 wherein said wheels are unitarily injection molded from synthetic resin.

7. The stepping mechanism defined in claim 6 wherein said toothed wheels have a common axial plane, said driven wheel comprises a plurality of long gear teeth constituting said gap-defining teeth and disposed between the gaps along the periphery of said driven wheel, said long teeth extending substantially the full thickness of said driven wheel, a tooth of intermediate length disposed between the gap-defining teeth of each gap, and a tooth of short length disposed between the tooth of intermediate length and one of the gap-defining teeth of each gap, said driving wheel being formed with a short-length tooth within the arc subtended by said cylinder segment and axially offset therefrom and adapted to clear said short-length tooth of a respective gap upon relative rotation of said driving wheel and said driven wheel until the short-length tooth of said driving wheel engages the intermediate-length tooth of said driven wheel at a location beyond said common axial plane in the sense of rotation of said driving wheel.

8. The stepping mechanism defined in claim 7 wherein said tooth segment comprises four gear teeth bridging said plane axially and said short-length tooth, said driven wheel comprises 20 teeth subdivided into four groups and including one long tooth, one intermediate length tooth and one short-length tooth in addition to two further long teeth, the cylinder segment being receivable between a pair of long teeth receiving the intermediate-length and short-length teeth of the respective group between them.

* * * * *